(12) United States Patent
Perez Garcia et al.

(10) Patent No.: US 10,046,729 B2
(45) Date of Patent: Aug. 14, 2018

(54) EXTERNAL AIRBAG SYSTEM

(71) Applicants: Dalphi Metal Espana S.A., Vigo (ES); Audi AG, Ingolstadt (DE)

(72) Inventors: Azucena Perez Garcia, Avila (ES); Emiliano Core Almarza, Laguna di Duero (ES); Andres Casanova Mateo, Valladolid (ES); Christian Weiss, Böhmfeld (DE); Michael Pichler, Karlskron (DE)

(73) Assignees: DALPHI METAL ESPANA S.A. (ES); AUDI AG (DE)

( * ) Notice: Subject to any disclaimer, the term of this patent is extended or adjusted under 35 U.S.C. 154(b) by 0 days.

(21) Appl. No.: 15/103,316

(22) PCT Filed: Dec. 17, 2014

(86) PCT No.: PCT/EP2014/003395
§ 371 (c)(1),
(2) Date: Jun. 10, 2016

(87) PCT Pub. No.: WO2015/090582
PCT Pub. Date: Jun. 25, 2015

(65) Prior Publication Data
US 2016/0355152 A1    Dec. 8, 2016

(30) Foreign Application Priority Data

Dec. 17, 2013  (EP) .................................... 13005860

(51) Int. Cl.
*B60R 21/36*  (2011.01)
*B60R 21/34*  (2011.01)
(Continued)

(52) U.S. Cl.
CPC .............. *B60R 21/36* (2013.01); *B60R 21/21* (2013.01); *B60R 21/233* (2013.01);
(Continued)

(58) Field of Classification Search
CPC .... B60R 21/21; B60R 21/36; B60R 2021/346
See application file for complete search history.

(56) References Cited

U.S. PATENT DOCUMENTS 7,828,106 B1 * 11/2010 Ratajski .................. B60R 21/13
                                                  180/274
7,967,098 B2 *  6/2011 Choi ....................... B60R 21/36
                                                  180/274
(Continued)

FOREIGN PATENT DOCUMENTS

CN    201301103    7/2011
DE      2020360   11/1971
(Continued)

*Primary Examiner* — Barry Gooden, Jr.
(74) *Attorney, Agent, or Firm* — Tarolli, Sundheim, Covell & Tummino LLP

(57) ABSTRACT

The present invention provides for an advantageous external side airbag system (1), comprising at least one airbag (3, 3a-3c) with at least one dedicated inflator (5a-5c). The external airbag system is characterized in that at least one airbag has in a folded state an elongated shape that extends in a longitudinal direction (L) and is configured to be integrated in a side structure (19) of a vehicle, and in particular between a rocker panel (21) and a sill cover (31) of a vehicle.

28 Claims, 14 Drawing Sheets

(51) Int. Cl.
  *B60R 21/233* (2006.01)
  *B60R 21/21* (2011.01)
  *B60R 21/231* (2011.01)
  *B60R 21/2338* (2011.01)
  *B60R 21/26* (2011.01)
  *B60R 21/00* (2006.01)

(52) U.S. Cl.
  CPC .... *B60R 21/2338* (2013.01); *B60R 21/23138* (2013.01); *B60R 21/26* (2013.01); *B60R 21/34* (2013.01); *B60R 2021/0006* (2013.01); *B60R 2021/23382* (2013.01); *B60R 2021/26058* (2013.01)

(56) References Cited

U.S. PATENT DOCUMENTS

| | | | |
|---|---|---|---|
| 9,027,696 B2* | 5/2015 | Park | B60R 21/36 180/274 |
| 9,205,792 B1* | 12/2015 | Clark | B60R 19/205 |
| 2002/0092693 A1* | 7/2002 | Breed | B60N 2/002 180/282 |
| 2003/0155750 A1* | 8/2003 | Hu | B60R 19/205 280/730.1 |
| 2003/0234525 A1* | 12/2003 | Igawa | B60R 21/2171 280/736 |
| 2004/0169362 A1* | 9/2004 | Hammer | B60R 19/205 280/751 |
| 2005/0230940 A1 | 10/2005 | Alexander et al. | |
| 2005/0269805 A1 | 12/2005 | Kalliske et al. | |
| 2006/0043712 A1 | 3/2006 | Hakki et al. | |
| 2007/0114090 A1* | 5/2007 | Okamoto | B60R 21/36 180/274 |
| 2008/0097699 A1* | 4/2008 | Ono | B60R 21/0134 701/300 |
| 2008/0243327 A1* | 10/2008 | Bujak | B60C 23/0481 701/33.7 |
| 2010/0116580 A1* | 5/2010 | Choi | B60R 21/36 180/274 |
| 2011/0048835 A1 | 3/2011 | Mishra | |
| 2013/0147174 A1 | 6/2013 | Kim et al. | |
| 2016/0355152 A1* | 12/2016 | Perez Garcia | B60R 21/233 |

FOREIGN PATENT DOCUMENTS

| | | |
|---|---|---|
| DE | 4231522 | 3/1994 |
| DE | 10203267 | 8/2003 |
| EP | 1568546 | 8/2005 |
| EP | 2520471 | 11/2012 |

* cited by examiner

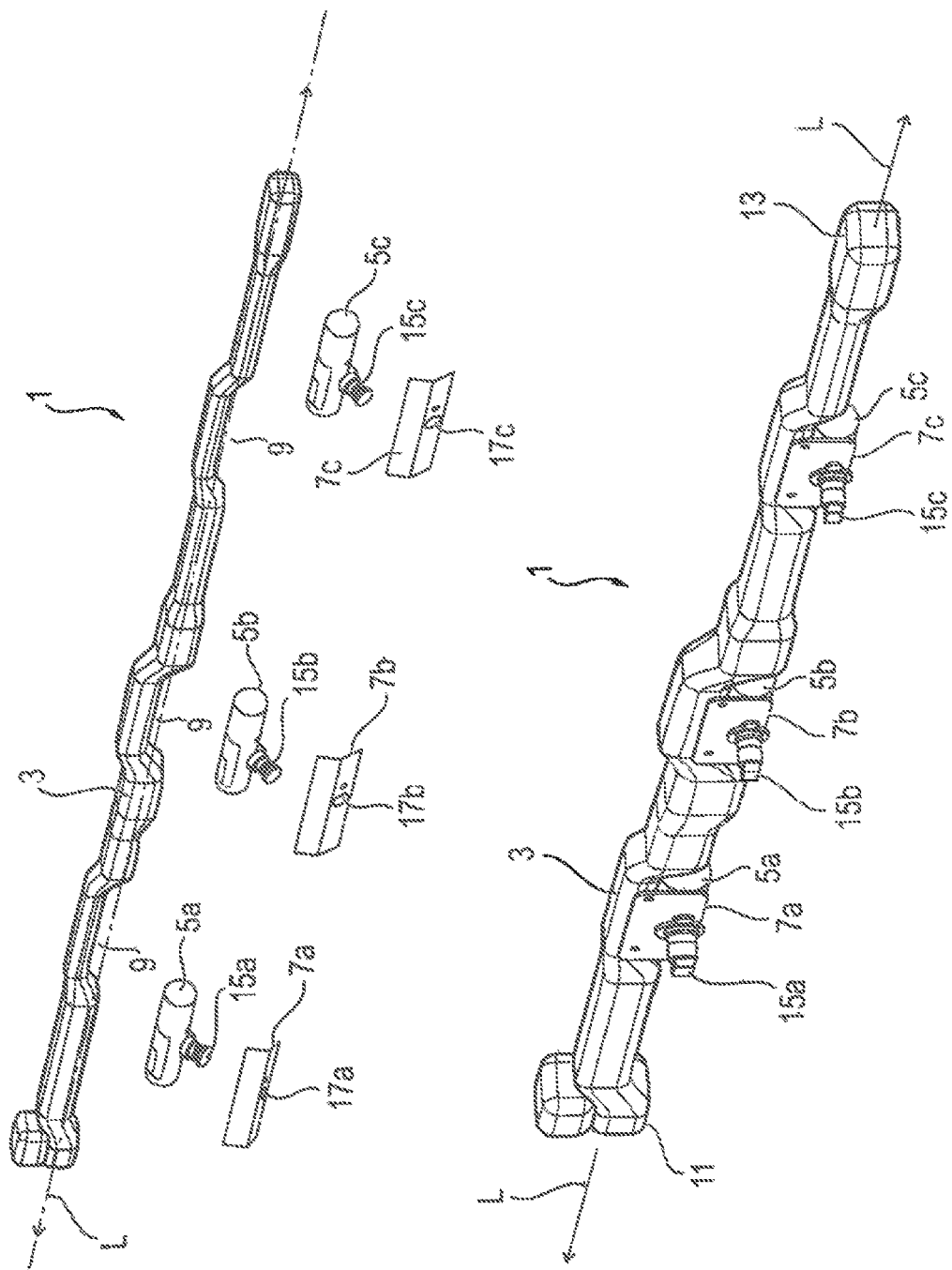

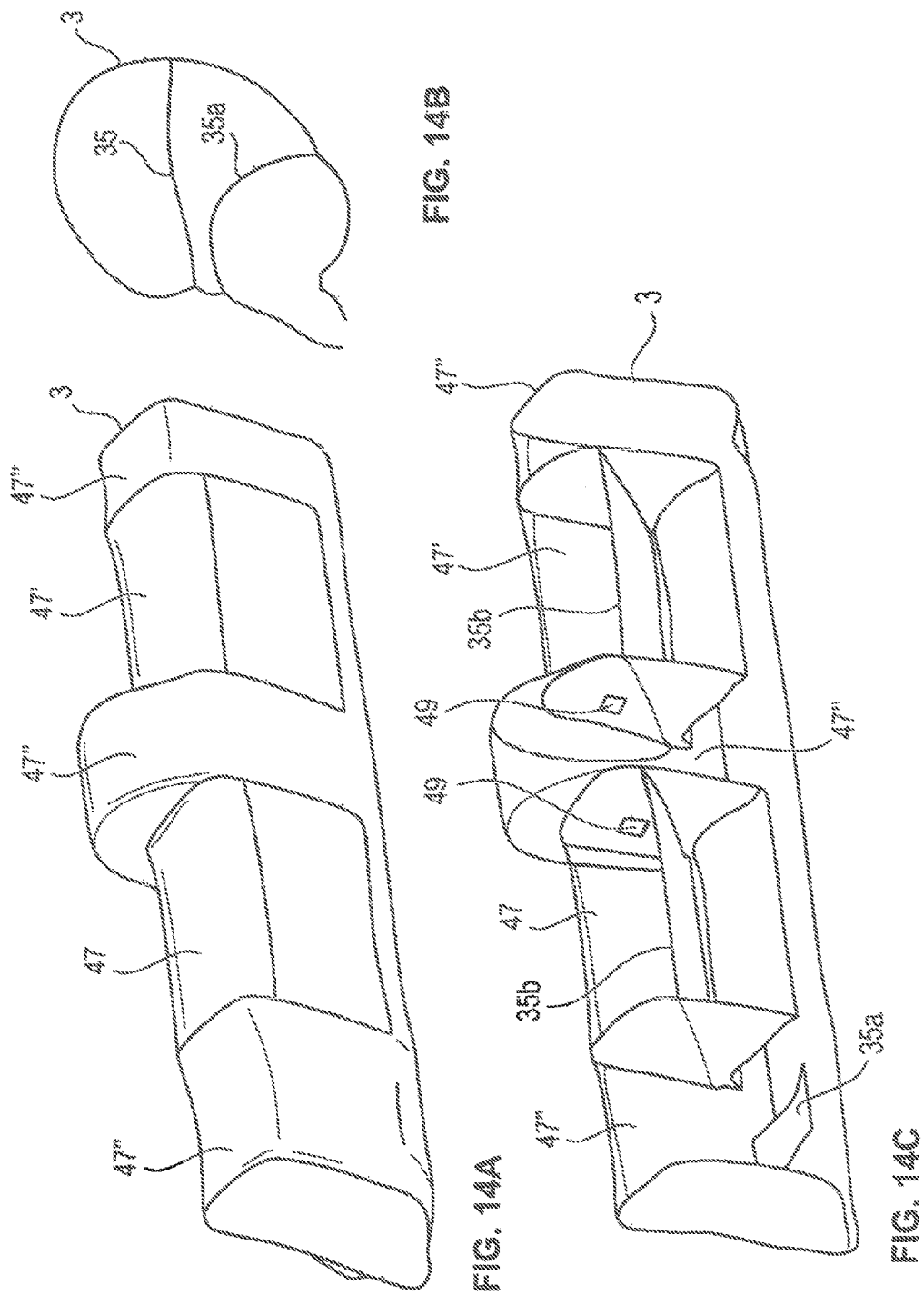

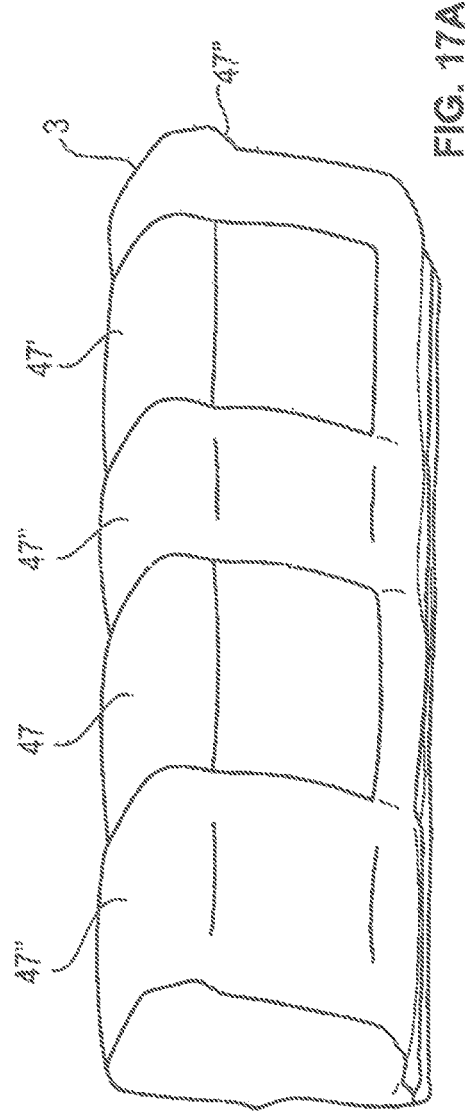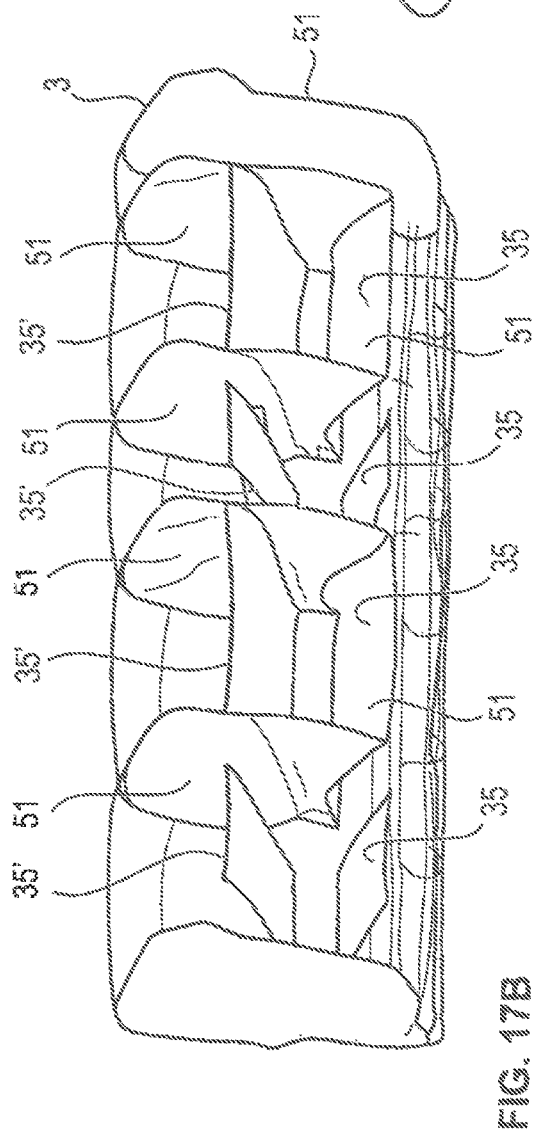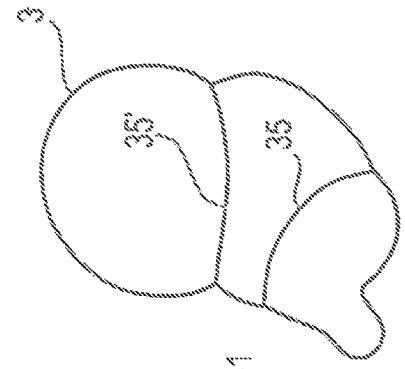

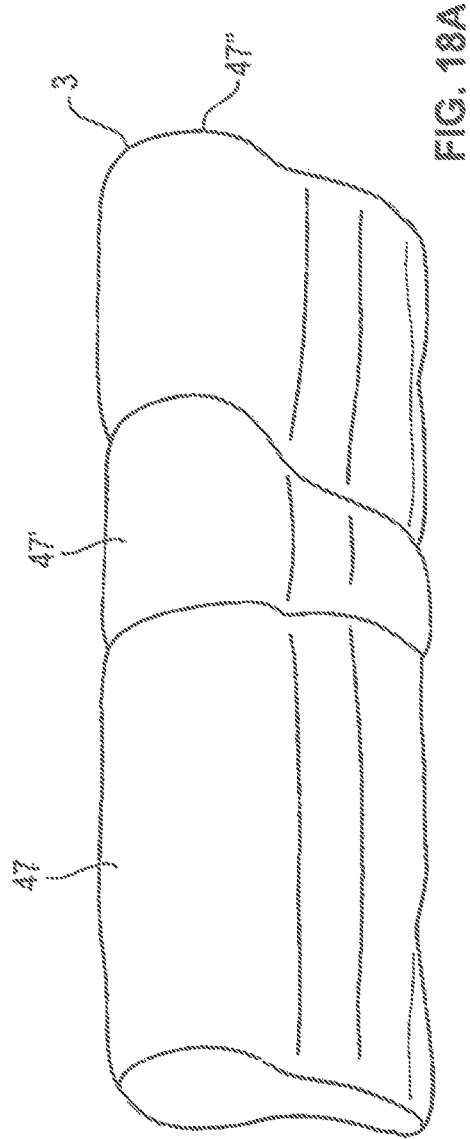
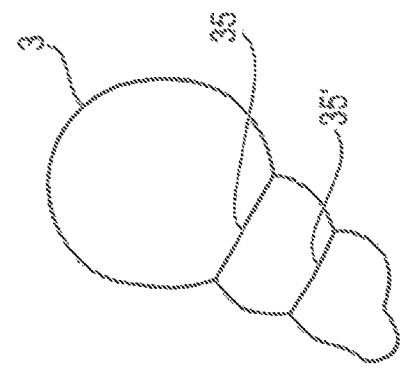
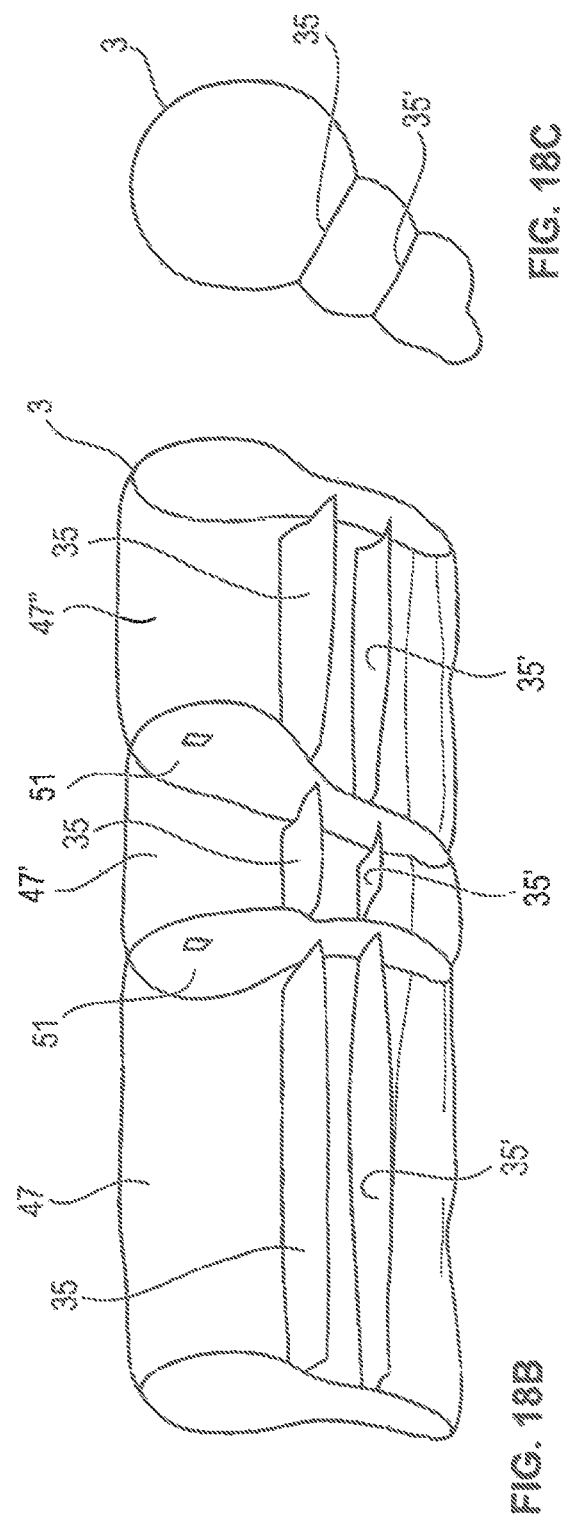

EXTERNAL AIRBAG SYSTEM

RELATED APPLICATIONS

This application corresponds to PCT/EP2014/003395, filed Dec. 17, 2014, which claims the benefit of European Application No. 13005860.5, filed Dec. 17, 2013, the subject matter of which are incorporated herein by reference in their entireties.

BACKGROUND OF THE INVENTION

The present invention relates to an external airbag system for automotive vehicles according to the preamble of claim 1 and to a vehicle according to claim 17.

Airbags for automotive applications have been widely described in the state of the art. Whereas internal airbags for preventing injuries in the case of side collisions have been presented, external airbags have been substantially described to protect pedestrians in the case of a collision with the front-end of a vehicle. The effects of side collisions between two vehicles are often more severe than front or rear collisions. Side collisions are a significant cause of road injuries. Side impacts account for 33.4% of fatalities and 28.1% of ail injuries in the US and represent 32.7% of all fatalities according to the UK, France and Swedish national data sets. The high severity level of side collisions is mainly due to the limited distance between the occupant and the struck vehicle's side as well as the short time between the beginning of the collision and the moment when the vehicle side structure contacts the occupant. Internal air-bags are often not sufficient to adequately protect the occupants of the vehicle in the case of a side collision. As a result, the occupants of the struck car often suffer from serious injuries resulting from vehicle deformations in the external side structure of the vehicle.

SUMMARY OF THE INVENTION

It is therefore an object of the present invention to provide an airbag, which is adapted to protect occupants of a vehicle from severe injuries resulting from a side collision with another vehicle.

In order to solve the above object, the present invention provides an external side airbag system comprising the features of claim 1. According to the invention, the external side airbag system comprises at least one airbag with at least one dedicated inflator. The airbag system is characterized in that the at feast one airbag in the folded state has an elongated shape that extends in a longitudinal direction and is configured to be integrated in a side structure of a vehicle, and in particular between a rocker panel and a sill cover of the vehicle.

An important point of the invention is to provide an external side airbag system, which follows at least partially the shape of a vehicle side structure, preferably in a length direction thereof. Thus, the present invention provides for an effective external side airbag system, which can be arranged at a side structure of a vehicle, in particular between a rocker panel and a sill cover thereof, and which is adapted to be activated prior to a collision between two vehicles or a vehicle and another colliding object. Owing to the elongated shape of the at least one side airbag in the folded state, the airbag can advantageously be integrated in a side structure of the vehicle. Preferably, the airbag is in a folded condition arranged in a mounting envelope. In case of a side collision, the sill cover of the vehicle will be removed or opened (e.g. by means of some detachable features or a tear line) by the inflating airbag. The external side airbag according to the present invention is advantageous, since it deploys from the external side structure of the vehicle upwardly to protect in a case of side impact. By placing the airbag in a lower portion of the side structure, specifically near the rocket panel, the airbag is located at least close to or directly in the impact area in case of a side collision. Thus, the airbag can be effectively inflated immediately at the region concerned. The airbag is adapted to at least partially absorb the energy of the side collision. It further reduces the intrusions and deformations in the struck car, and therefore reduces occupant injuries. The airbag is based on a three-dimensional high volume cushion, which comprises internal tethers to control the thickness of the inflated airbag and to support the bag deployment in an upward direction.

Preferably, the external side airbags system according to the invention comprises fixation means for fixing the at least one inflator and the airbag to a side structure, specifically to the rocker panel of a vehicle. In an advantageous configuration of the external side airbag system, a plurality of fixation means are provided, wherein each inflator is assigned to a fixing means for providing the respective inflator and thereby the airbag to the rocker panel. By arranging the flat and elongated external side airbag between a rocker panel and a sill cover, the external side airbag system can easily be provided, m particular on both sides of the vehicle, during construction of the vehicle.

Preferably, the size and shape of the at least one airbag in an (upwardly) inflated state is such that it is adapted to cover at least partially the doors and at least the B-pillar of a vehicle. However, the size and shape of the at least one airbag can also be such that it is additionally adapted to cover at least partially the A-pillar, C-pillar, as well as the sill and rocker area of the vehicle.

In an advantageous configuration of the external side airbag system according to the invention, there are a plurality of inflators, in particular at least three inflators provided that are substantially regularly distributed over the entire length of the at least one airbag in the longitudinal direction thereof. That is, with the at least three inflators, the high volume airbag can easily be filled with an appropriate pressure level in a very short period of time. This is particularly true, if a single airbag is provided, which is constructed as a single- or multi-chamber airbag. In another embodiment the inflators are non-regularly distributed over the entire length of the airbag.

In order to solve the above object, a further external side airbag system according to the invention comprises at least one airbag which has at least one internal tether that is attached to the inner walls of the at least one airbag and is constructed such that the at least one airbag deploys in a direction substantially perpendicular to the longitudinal direction of the at least one airbag. Thereby, the direction perpendicular to the longitudinal direction of the at least one airbag constitutes the vertical/upward direction in an integrated state of the airbag.

Preferably, the at least one internal tether extends in the inflated airbag in a direction substantially perpendicular to the longitudinal direction of the folded airbag and is attached to internal airbag walls that are arranged on opposite sides with respect to a plane that cuts a longitudinal axis of the at least one airbag. In a state where the airbag system is integrated in a vehicle, the opposing internal walls are opposite with respect to the side structure of the vehicle. With this configuration, it is possible to provide an advantageous airbag which substantially extends along the external side structure of the vehicle in an upward direction thereof.

In a further preferred configuration, a plurality of internal tethers may be provided that are strap-shaped and substantially regularly distributed in at least one row over the entire length of the at least one airbag in the longitudinal direction thereof. The internal tethers may be arranged in at least two layers that are arranged in a distance from each other in a vertical direction of the at least one airbag. With this configuration, the thickness of the airbag can be controlled during the inflation and the vertical deployment can be advantageously supported by the tethers. Thus, by means of the internal tethers, upward deployment of the airbag in a vertical positioning is possible. It is to be understood that the internal tether's position is different depending on the specific airbag design and on the vehicle geometry. The internal tethers thus transfer the bag pressure into tension in tethers and fabric.

Preferably, the airbag comprises a two layer fabric constructions. Owing to this, a bettor resistance of the airbag results for high pressure levels (approx. 1.5 bars) as well as a better resistance to the tearing or breakage in a real collision due to the interaction with aggressive parts or edges of the striking vehicle or object. That is, the provision of two layers even increases the safety of the external side airbag according to the present invention. In a special, alternative embodiment, a single layer is provided. In this embodiment, a particular rigid material is provided.

In a preferred embodiment of the present invention, the interior of the at least one airbag may comprise a single chamber which is adapted to receive an inflation gas from the at least one inflator, and in particular from a plurality of inflators, to establish a substantially uniform pressure level in the single chamber.

In order to solve the above object, a further external side airbag system according to the invention comprises at least one airbag which may comprise two or more separate chambers, wherein each chamber receives inflation gas from a dedicated inflator such that different chambers may contain different pressure levels in the inflated state of the airbag. Preferably, the two or more chambers are separated from each other via fabric panels and preferably connected via one or more venting holes to each other. In this preferred configuration, the pressure in the airbag and the geometry of the individual chambers can be adjusted to achieve an optimal performance for each vehicle environment. For example, a lower pressure chamber may be provided to cover the doors of a vehicle, wherein higher pressure chambers may be provided to cover pillars and the sill. Furthermore, the height of the airbag may vary over the entire length of the airbag and may specifically be higher in front of ins B-pillar. It is further possible to vary the thickness of the airbag in the vertical direction. For example, the airbag may have a reduced thickness in front of the sill and a higher thickness in front of the doors and the B-pillar.

In order to solve the above object, a further external side airbag system according to the invention comprises two or more separate airbags, which are provided and arranged adjacent to each other in the longitudinal direction of the airbag system, which are adapted to cover in an inflated state at least parts of a vehicle side structure.

Thereby, the two or more separate airbags may be arranged next to each other, wherein the two or more separate airbags are preferably connected to each other via a non-inflatable fabric. A plurality of independent airbags may thus be connected via a fabric to stabilise the overall external side airbag system. Thus, the independent airbags can be individually adjusted with respect to the pressure and geometry to achieve an optimal performance for each vehicle environment. For example, inflatable airbags may be provided in the area of the A-, B- and C-pillars, whereas non-inflatable fabric may be located between the separate airbags in order to stabilise the structure of the airbag system.

Preferably, the external airbag system according to the invention comprises a pre-crash sensing system, which is adapted to detect a collision object and upon detection to fully deploy the airbag before physical contact with the collision object. Such a collision object is in particular another vehicle, which approaches the side structure of the vehicle having the integrated pre-crash sensing system. In particular, the pre-crash sensing system may comprise at least one sensor for sensing a collision object, in particular a camera and/or a radar and/or a lidar system.

In order to solve the object, the present invention also provides for a vehicle, in particular an automotive vehicle, comprising an external side airbag system according to the invention.

BRIEF DESCRIPTION OF THE DRAWINGS

In the following, the present invention will be described by means of the following drawings:

FIG. 1 An exploded view of an external side airbag system according to the present invention;

FIG. 2 A perspective view of the external side airbag system according to the present invention in an assembled state;

FIG. 14A-C Different views of a multi-chamber airbag according to FIG. 11;

FIG. 17A-C Different perspective views of an external side airbag system comprising a multi-chamber airbag of FIG. 15;

FIG. 18A-C Different perspective views of an external side airbag system comprising a multi-chamber airbag of FIG. 16;

DESCRIPTION

Figure 3:
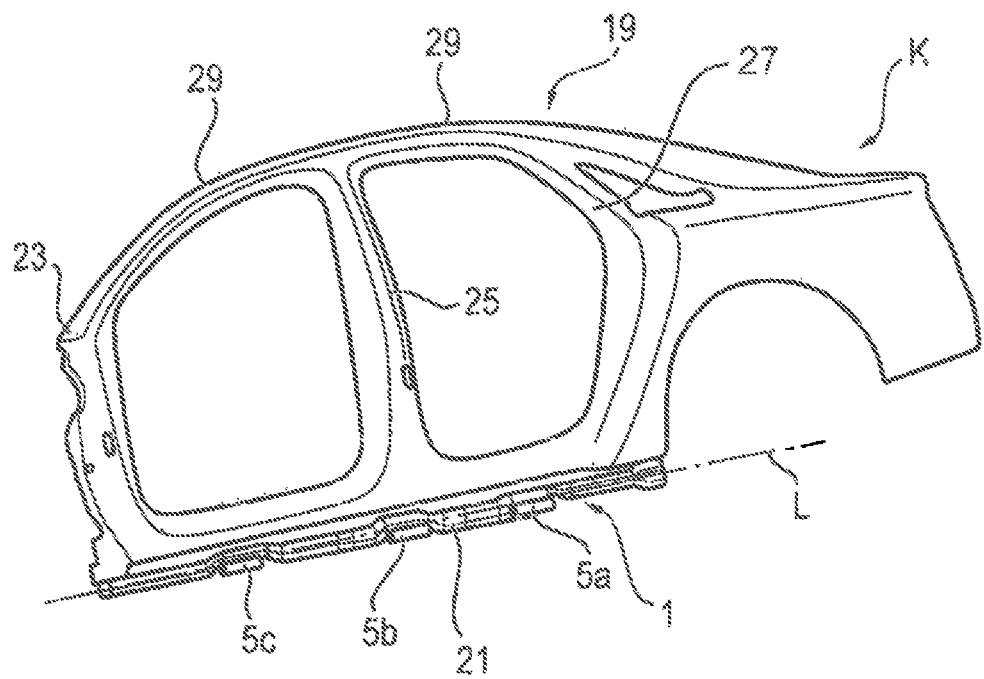
FIG. 3 A perspective view of an external side airbag system according to the present invention, wherein the external side airbag system is integrated in a side structure of a vehicle.

FIG. 1 shows a perspective exploded view of an external side airbag system 1 according to the present invention. The external side airbag system 1 comprises in the illustrated embodiment a single airbag 3, which is illustrated in a folded state, as well as three dedicated inflators 5a-5c. As can be seen from the folded airbag 3 of FIG. 1, the airbag has an elongated shape that extends in a longitudinal direction L. In order to maintain the shape of the folded airbag it may be positioned in a mounting envelop comprising a break line. The airbag 3 is configured to be integrated in a side structure of a vehicle as will later be explained with respect to FIGS. 3 and 4 and thus, the elongated shape of the airbag is such that it fits into the side structure of a vehicle.

For fixing the external side airbag system 1 to the side structure of a vehicle, and in particular to a rocker panel, fixation means 7a-7c are provided for fixing the inflators 5a-5c to the rocker panel. The fixation means 7a-7e may be brackets or any other suitable fixation means for fixing the airbag system to a side structure of the vehicle and in particular to the rocker beam of the vehicle.

As can be seen from FIG. 1, the airbag 3 is folded such that indentations 9 allow for a positioning of the inflators 5a-5c in the longitudinal direction L of the airbag 3. The indentations 9 are such that they substantially correspond to the shape and size of the inflators 5a-5c, which in the present case have a substantially cylindrical shape. Owing to this folding structure of the airbag 3, the external side airbag system 1 is constructed in a space saving manner in the folded state of the airbag 3.

As can further be seen from FIGS. 1 and 2, the inflators 5a-5c are substantially regularly distributed over the length of the airbag 3 in the longitudinal direction L. That is, the distance between two inflators 5a-5c as well as the distance between the longitudinal end portions 11 and 13 of the airbag and the inflators 5a and 5c are substantially equal. If needed, this distance may be a little bit different. In particular, the distance between inflators depends on the chambers dimensions and on the available space in the rocker area for the inflator integration. Furthermore, in the present embodiment each of the substantially cylindrical inflators 5a-5c comprises a connection pin 15a-15c, which is intended to co-operate with a respective aperture 17a-17c provided in the fixation means 7a-7c. The inflators 5a-5c, which are attached to the airbag 3 can thus be fixed to the fixation means 7a-7c, which in turn are connected to a side structure of the vehicle and in particular to a rocker beam in a lower portion thereof.

With respect to FIGS. 1 and 2 it is to be understood that the length of the airbag 3 in the longitudinal direction L can vary depending on the size and in particular on (the length of the associated vehicle. Additionally, the diameter (the cross-sectional dimension) of the airbag can vary depending on the overall size of the associated vehicle to be protected by the external side airbag system.

Furthermore, the embodiment shown in FIGS. 1 and 2 of an external side airbag system comprises three inflators, wherein each inflator is associated with a respective fixation means 7a-7c. However, depending on the type and size of the inflators, on the airbag as well as the associated vehicle, the number of the inflators as well the distances between them can vary and be adjusted to the specific application of the external side airbag system 1. Whereas the airbag 3 may be of a special size and shape in order to protect a side structure of a vehicle in a case of side collision, the inflators 5a-5c may be conventional inflators, also known as gas generators, which have been extensively described in the prior art.

FIG. 3 shows a perspective view of an external side airbag system 1 according to the invention, which has been integrated in a side structure 19 of a vehicle K. More specifically, the external side airbag system 1 according to the present invention is located adjacent to the rocker panel 21 in a lower (close to the floor) part of the vehicle side structure 19. In a preferred embodiment of the invention, the external airbag system 1 comprising one or more airbag 3 is constructed such that it extends along the complete length of the rocker panel 21 and thus extends from the A-pillar 23 over the B-pillar 25 to the C-pillar 27. As can by seen from FIG. 3, the inflators 5a-5c face away from the vehicle side structure 19 and specifically from the rocker panel 21, whereas the connecting pins 15a-15c of the inflators 5a-5c associated with the fixation means 7a-7c are facing towards the rocker panel 21. Alternatively, they could be orientated also in other directions, depending on the inflator characteristics and fixation possibilities.

The rocker panel is considered to be suitable for fixing the external side airbag system 1 to the vehicle side structure 19, since it is found on most passenger automobiles. It is typically made out of metal and is located below the side doors.

According to the present invention, it is in principle also possible to place the external side airbag system 1 to another external part of the vehicle side structure 19, such as for example to the roof pillar 29, which extends between the A-pillar 23, B-pillar 25 and C-pillar 27. However, placing the airbag system in the lower portion of the vehicle side structure is advantageous, since it is closer to the affected area in case of a side collision.

Figure 4:
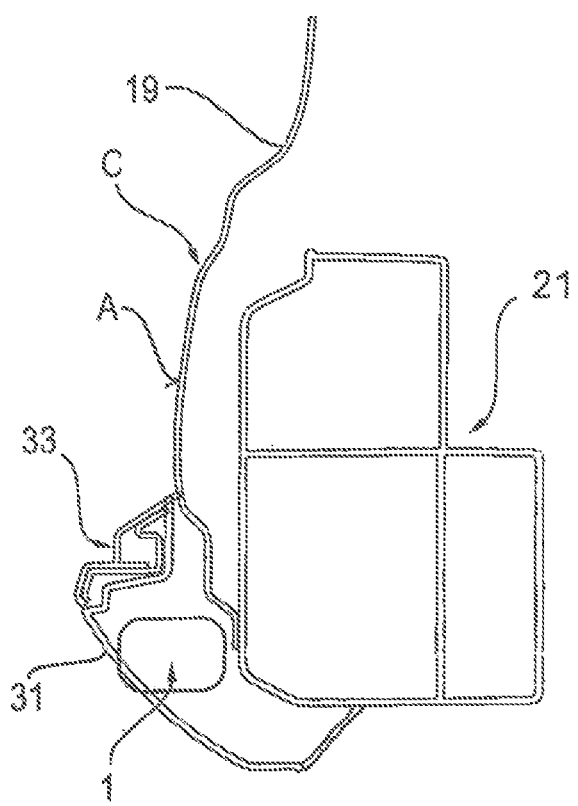
FIG. 4 A schematic sectional view of an external airbag system integrated between a rocker panel and a sill cover of a vehicle.

FIG. 4 shows a schematic cross-sectional view of the integrated external side airbag system 1 in the vehicle side structure 19. As can be seen, the external side airbag system 1 is located close to the rocker panel 21 and is preferably attached to it by means of the fixation means 7a-7c (not illustrated in FIG. 4). More specifically, the external side airbag system 1 is located between a cover, in particular a sill cover 31 and the rocker panel 21. In the event that a pre-crash system detects a collision object approaching the side structure 19 of the vehicle, the inflators 5a-5c are ignited at the same time and the airbag deploys by means of the inflation gas in an upward direction. Thereby, the silt cover 31 triggers and falls off the vehicle side structure 19. Alternatively, the sill cover could open without, separation of the vehicle by means of some detachable features or tearing/breaking line. Preferably, the sill cover 31 is detachably connected to the another portion of the vehicle side structure 19 via a predetermined breaking point, preferably by means of a suitable releasable connection mechanism 33.

As can be seen from FIGS. 1 to 4, the structure of the folded airbag of the external side airbag system 1 according to the present invention is such that owing to its elongated shape which substantially corresponds to the peripheral shape of at least a part of the vehicle side structure, it can easily be integrated in the side structure of a vehicle. Furthermore, due to the substantially thin and bar-/rod-shaped form of the external side airbag system 1, it can even be integrated in the vehicle side structure 19 between the rocker panel 21 and a sill cover 31 of a vehicle. Thereby, the integration of the external side airbag system 1 according to the present invention can easily be done during the construction of the vehicle body during manufacturing of the car.

Figure 5:
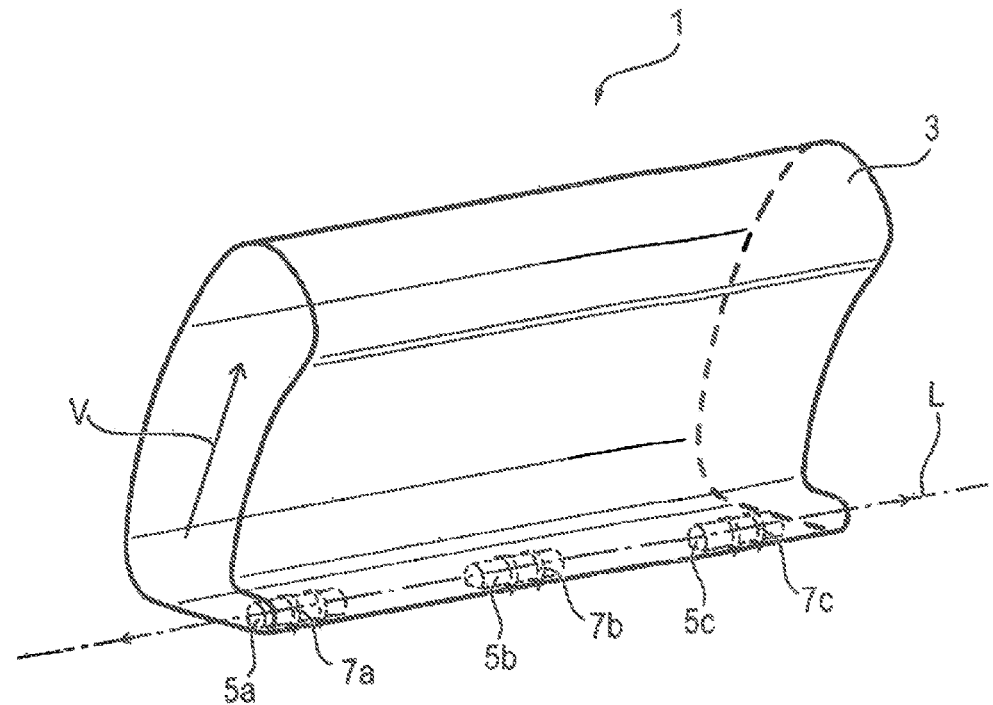
FIG. 5 A perspective view of an external side airbag system in an inflated state.
Figure 6:
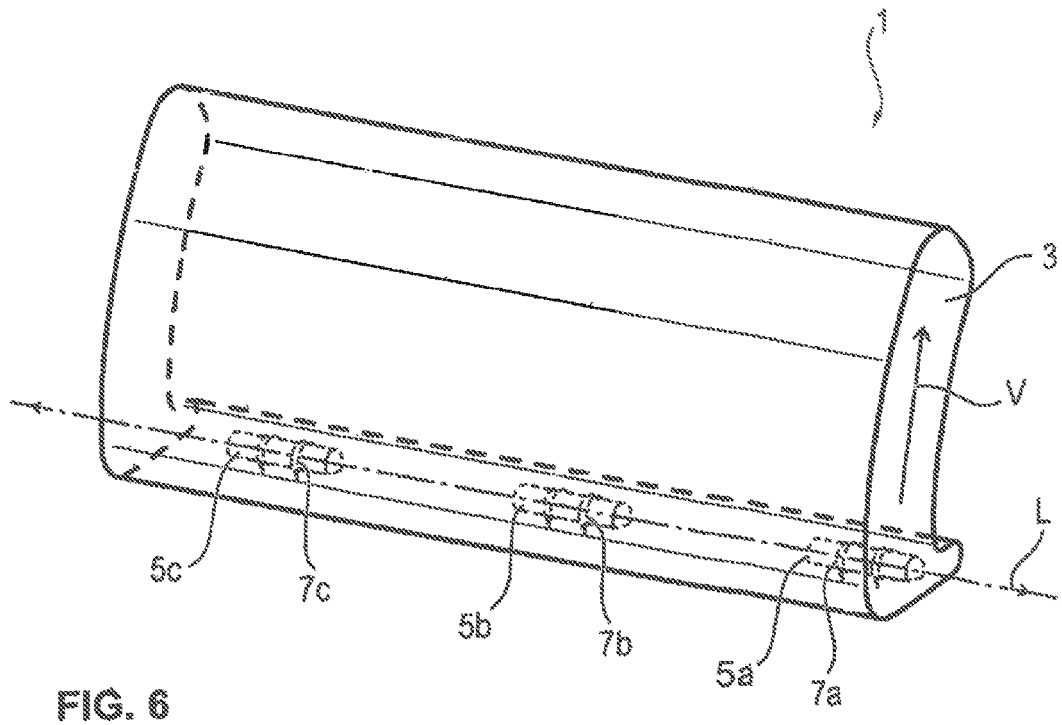
FIG. 6 Another perspective view of the external side airbag system in an inflated state.

FIGS. 5 and 6 show principle illustrations of an inflated external side airbag system 1 according to the present invention. As can be seen, the airbag 3 is constructed such that starling from the folded position (see FIGS. 1 and 2) it inflates in a vertical direction V, which is substantially perpendicular to the longitudinal direction L of the airbag 3 in the folded state. As can be seen from FIGS. 5 and 6, the inflators 5a-5c are still aligned in the longitudinal direction L after the inflation of the airbag 3. It should be clear that the term "longitudinal direction" does not necessarily imply that the airbag in a folded state follows a straight line. Rather, the elongated shape of the folded airbag 3 may also be such that it follows a curved structure of the vehicle side structure 19.

In the integrated stale of the external side airbag system 1 near the rocker panel 21 of the vehicle, the vertical direction V is substantially parallel to a plane, in which the side structure 19 of the vehicle is at least partially arranged. More specifically, the direction V, which is the inflation direction of the airbag 3 should at least substantially be parallel to a plane, in which the side doors of the vehicle are arranged. Furthermore, it should be noted that in contrast to airbags which are used to protect occupants of a vehicle or pedestrians that are hit by a car, the external side airbag 1 according to the present invention is constructed such that at least a part of an impact energy of a vehicle that strikes the side structure 19 of the vehicle is readily absorbed. For this purpose, the size and shape and also the internal pressure of the airbag 3 may differ from conventional airbags.

For inflating the airbag 3 in the desired vertical direction V (upwardly), which is substantially perpendicular to the longitudinal direction L of the elongated shaped folded airbag, the airbag 3 may comprise a plurality of internal tethers to control the thickness of the inflated airbag 3 and to support the bag deployment. Furthermore, the internal tethers transfer the bag pressure info tension in tethers and fabric. The internal tethers according to the present invention are provided such that it develops optimal upward deployment characteristics of the airbag 3.

Figure 7:
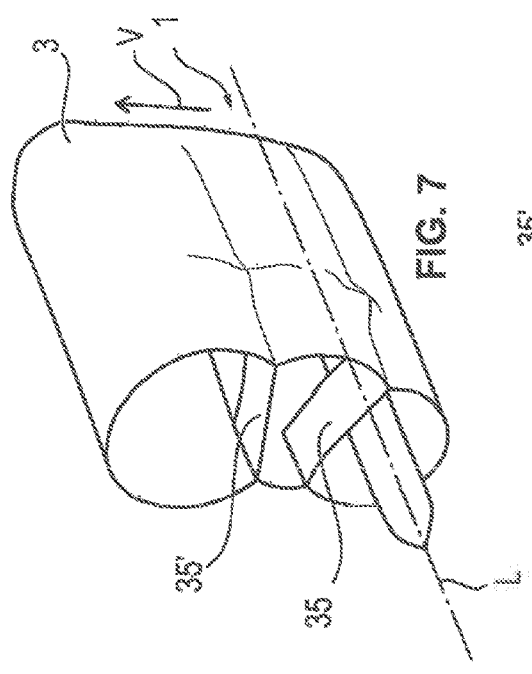
FIG. 7 A perspective cross-sectional view of the external airbag system.
Figure 8:
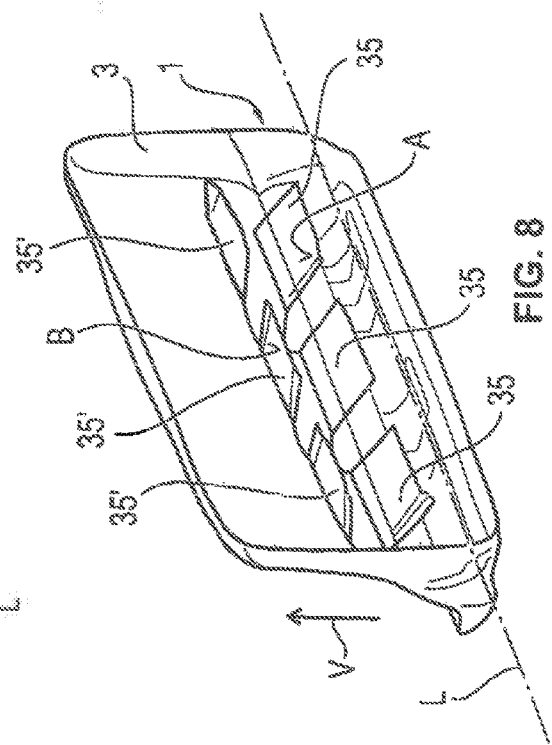
FIG. 8 A perspective vertical sectional view of the external side airbag system.
Figure 9:
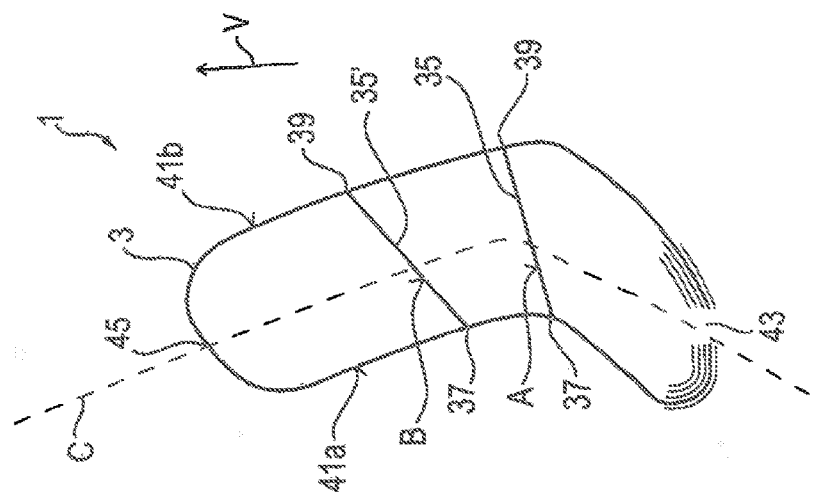
FIG. 9 A schematic cross-sectional view of the external airbag system according to FIGS. 7 and 8.

FIGS. 7 to 9 show an embodiment of the invention, wherein six internal tethers 35 and 35' are provided to control the thickness and the vertical deployment of the airbag 3. More specifically. FIG. 8 illustrates an airbag 3, comprising a plurality of tethers 35, 35' which are strap-shaped and which are regularly arranged in certain distances from each other and connecting to the internal side walls of the airbag 3.

In FIG. 8, three tethers 35 are arranged substantially in parallel in a common plane or in other words at a similar height level in the vertical direction V of the inflated airbag 3. The three tethers 35 are arranged in a common plane A. A similar configuration is given for three further tethers 35', which are arranged in a common plane B. As can clearly be seen from FIG. 9, the planes A and B of the tethers 35 and 35' are not arranged parallel to each other but under an angle, which opens in the present example to the side of the airbag 3, which faces away from the side structure 19 of the vehicle En an installed condition of the external side airbag system 1.

Each of the tethers 35 and 35' comprises a first end 37 and a second end 39, wherein the first and second ends 37 and 39 are attached to the internal wall of the airbag 3. In particular, the first and second ends 37 and 39 of the tethers may be sewn to the internal walls of the airbag 3. More specifically, the airbag 3 may virtually be divided in two internal walls 41a and 41b which are located on opposites sides of a virtual plane C, which cuts the longitudinal axis L of the at least one airbag. In other words the first internal wall 41a is considered to extend from an airbag mouth 43, which is connected to an inflator, to a point 45 in a distal portion of the inflated airbag 3. Thus, the first internal wall 41a faces the side structure 19 of the vehicle in the installed condition of the external side airbag system 1, whereas the second internal wall 41b opposite the first internal wall 41a faces away from the side structure 19 of the vehicle.

Furthermore, the internal wall 41b extends from the airbag mouth 43 to the distal point 45 and faces away from the side structure 19 of the vehicle. In this configuration, a first end 37 of a tether 35, 35' is attached to a first internal wall 41a and the opposite second end 39 of a tether 35, 35' is connected to the opposite side wall 41b of the airbag 3. As can be seen from FIG. 9, the first ends 37 of the tethers 35 and 35' are located at a shorter distance from each other than the opposite second ends 39 of the tethers 35 and 35'. Owing to this configuration, the airbag 3 is upwardly bent towards the side structure of the vehicle such that the wall 41a of the airbag 3 preferably touches the vehicle side structure 19 or is at least arranged close to it. The different distances between the first ends and the second ends of at least two layers of tethers are thus adapted to provide for a substantially C-shaped or L-shaped form of the inflated airbag 3, which inflates in the vertical direction V being substantially parallel to the side structure 19 of the vehicle.

FIGS. 10A-10E show further embodiments of airbags 3 according to the present invention, which deploy in a vertical direction V in order to provide the inflated airbag 3 in an area between the vehicle K and a further vehicle (or other colliding object), which is about to strike the side structure 19 of vehicle K.

Figure 10A:
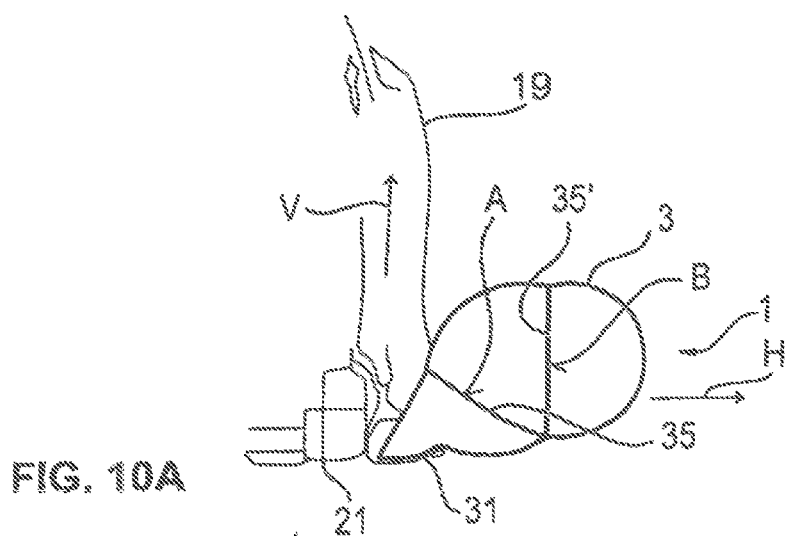
FIG. 10A-E Schematic cross-sectional views of different external airbag systems.

FIG. 10A shows an embodiment of an airbag according to the present invention, which deploys not only in the vertical direction V and thus along the surface of the side structure 19 of the vehicle, but also in the horizontal direction H, which is substantially perpendicular to the vertical direction V and the longitudinal direction L of the folded airbag. Additionally, the horizontal direction is substantially parallel to a floor, on which the vehicle having the airbag system stands. Owing to this configuration, the thickness of the airbag 3 is increased in the horizontal direction H, such that there is an increased distance between the vehicle comprising the external side airbag system 1 and a further vehicle (or other colliding object), which is about to strike this car.

In order to provide a thicker inflated airbag 3 in the horizontal direction H, the configuration of two layers of tethers 35 and 35' substantially corresponds to the configuration shown in FIGS. 7 to 9. However, unlike the embodiments of FIGS. 7 to 9, the angle between the two planes A and B opens towards the side face of the side structure 19 of the vehicle and not towards the side facing away from the side structure 19 as it is the case in FIG. 9. In the embodiment of FIG. 10A, this is done by providing a bigger distance between the first ends of the tethers 35 and 35' and to substantially minimize the distance between the second ends 39 of the tethers 35 and 35'. This configuration is also advantageous, since the tethers 35 and 35' can in principle be made from one piece of fabric, which is connected with its first end and second ends to the first internal wall 41a and in a middle part to the internal wall 41b.

Figure 10B:
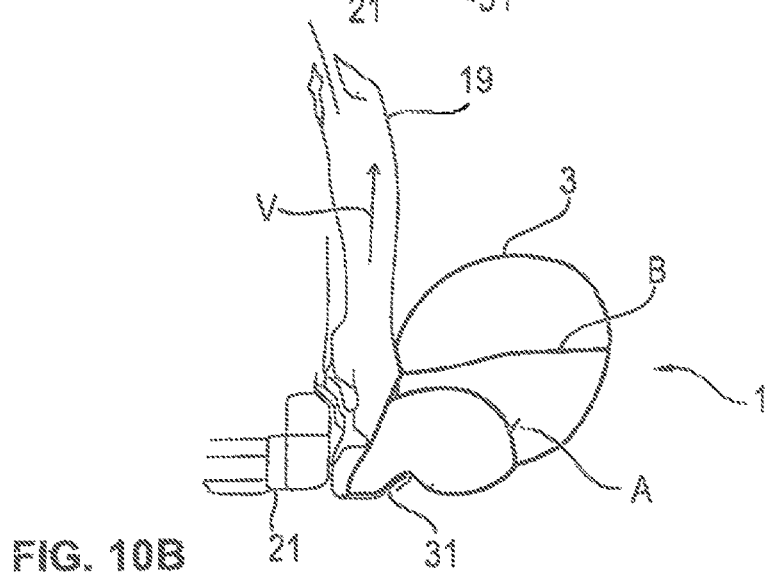
Figure 10C:
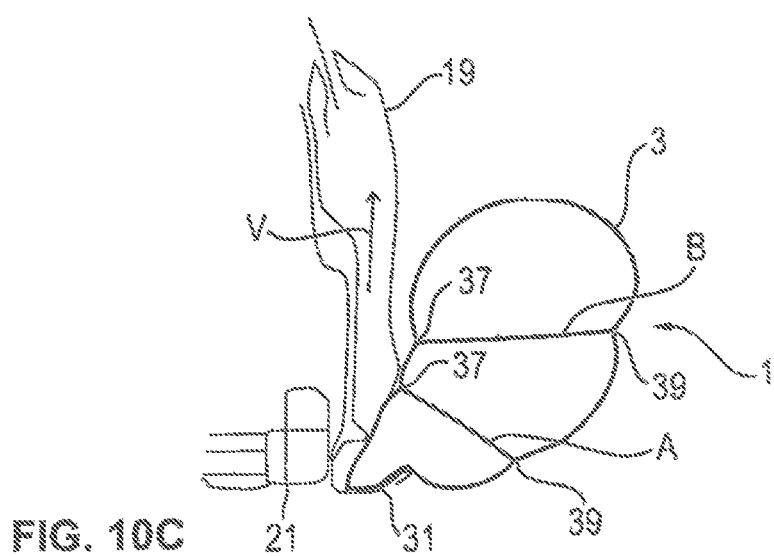
Figure 10D:
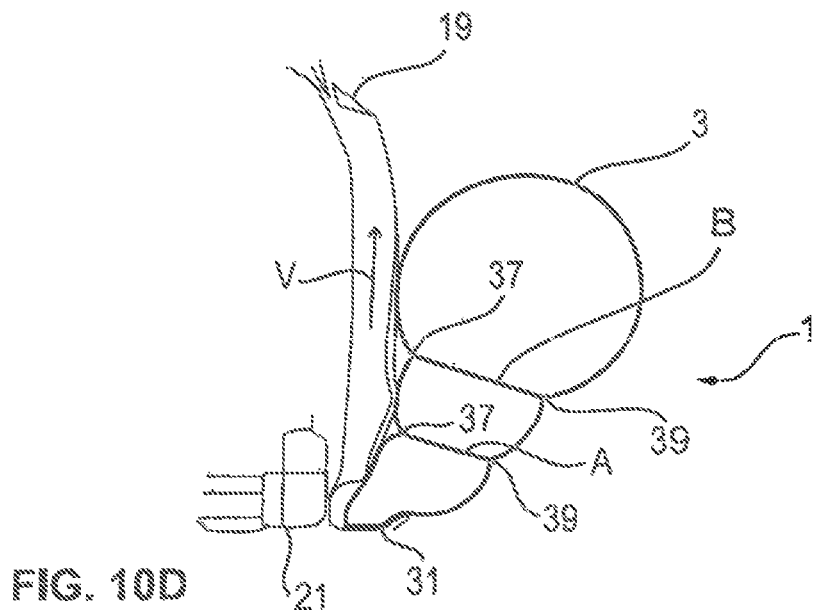
Figure 10E:
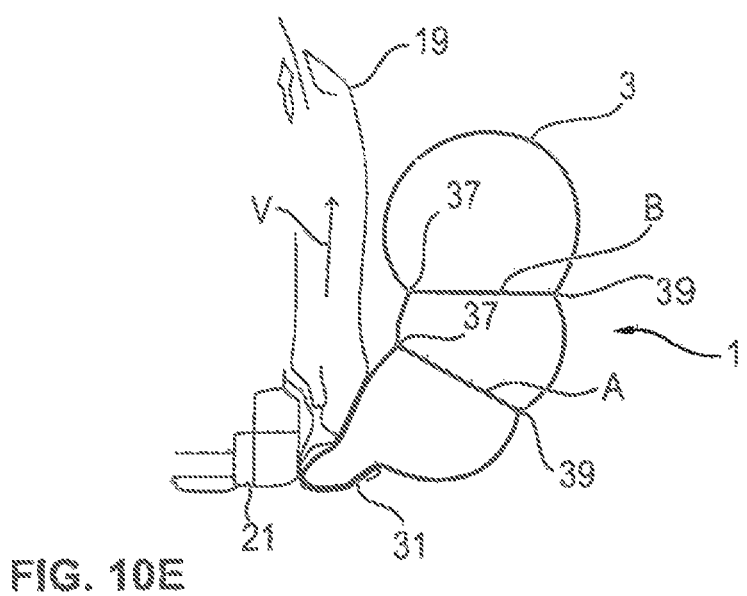

The embodiments according to the FIGS. 10B and 10C substantially correspond to the embodiment of FIG. 10E, wherein the planes A and B, of the tethers 35 and 35" include an angle, which opens to the internal wall 41b facing away from the side structure 19 of the vehicle. As can be seen from FIGS. 10C and 10D, the shape of the airbag 3 can also be influenced by means of the lengths of the tethers 35 and 35' between the first and second ends 37 and 39. Such a configuration can result in an airbag shape shown in FIG. 10D, where the volume of the airbag 3, i.e. the thickness of the airbag 3 in the horizontal direction H, increases in a vertical direction V.

In conclusion, the internal (ether's position and structure (e.g. length, thickness, shape) can be different depending on the airbag design and vehicle geometry. However, in all cases, internal tethers allow transferring the bag pressure into a tension in the tethers are fabrics in order to achieve a vertical bag positioning.

Figure 11:
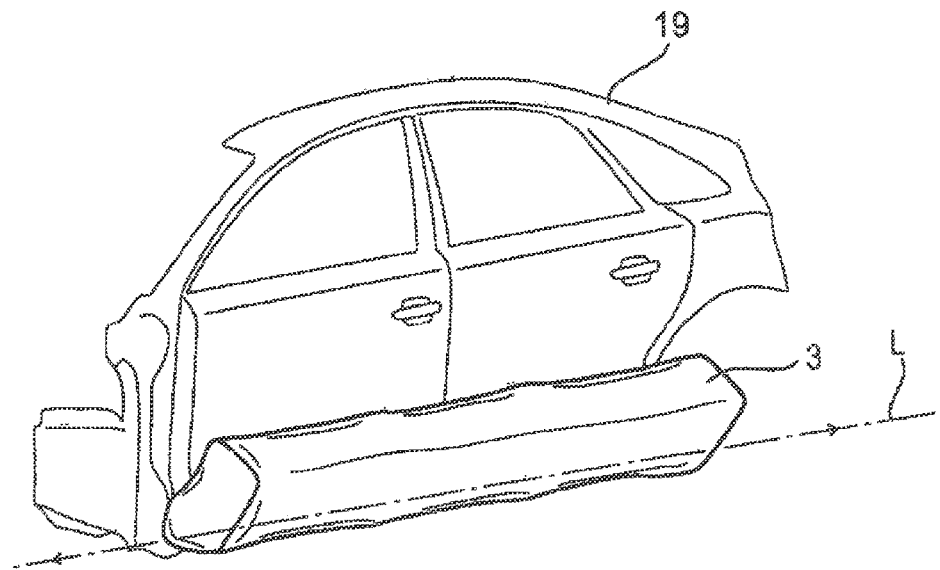
FIG. 11 A schematic perspective view of an external airbag system comprising a single chamber airbag according to the present invention.

FIG. 11 shows an inflated external side airbag 3, which is integrated in a side structure 19 of a vehicle. In the illustrated embodiment, the airbag comprises a single chamber, which extends in the longitudinal direction L along the rocker panel 21. Owing to the single chamber configuration of the airbag 3, a similar pressure level is present in the whole airbag. As can be seen from FIG. 11, the airbag 3 covers the side doors as well as the B-pillar.

Figure 12:
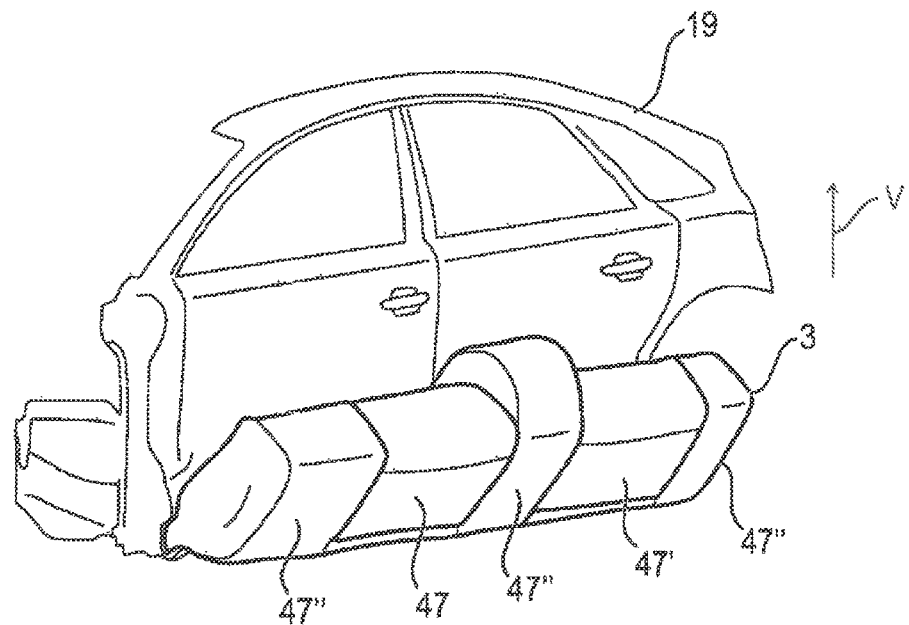
FIG. 12 A schematic perspective view of an external side airbag system comprising a multi-chamber airbag according to the present invention.
Figure 13B:
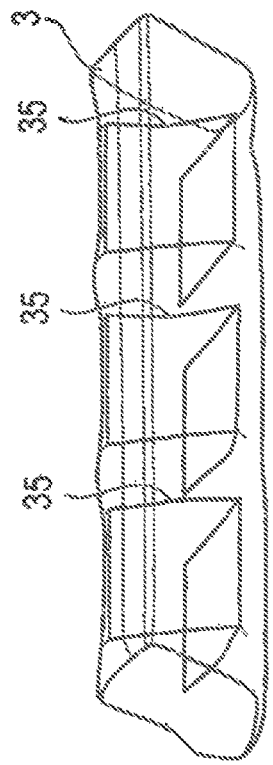
FIG. 13A-C Different views of a single chamber airbag according to FIG. 11.
Figure 13D:
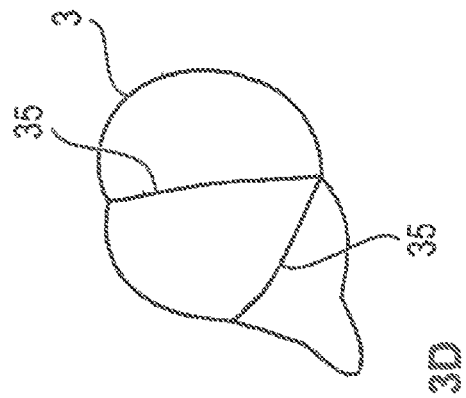
Figure 13A:
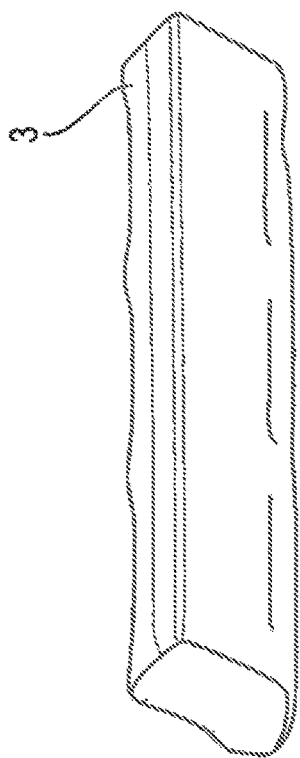
Figure 13C:
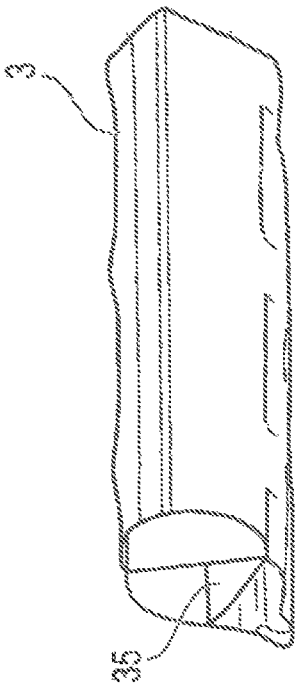

FIG. 12 shows a further embodiment of the invention, which comprises an external side airbag 3 having three chambers 47, 47' and 47". Thereby, each of the chambers 47 to 47" is preferably connected to a dedicated inflator, which provides a specific pressure level to a chamber. It is also possible to connect the two middle chambers 47 and 47' to provide a similar pressure level therein. In this case, the external side airbag 3 comprises only two chambers having two different pressure levels. As can be seen from FIG. 12, the pressure chamber 47" surrounds the chambers 47 and 47' at least partially and is split up in different chamber portions covering different parts of the vehicle side structure 19.

In this embodiment of the invention, the chambers 47 and 47', which may be combined to form a single chamber, have a lower pressure level for covering the doors in the inflated state of the airbag. In contrast to this, chamber 47" covers the pillars as well as the sill and provides a higher pressure level. Furthermore, as can be seen from FIG. 12, the airbag 3 is higher in the vertical direction V in the middle region, i.e. in the region of the B-pillar than in the other regions of the airbag 3. This configuration provides an increased protection of the B-pillar.

FIGS. 13A-13D show different views of the single-chamber airbag 3 illustrated in FIG. 10A. As can clearly be seen, one-piece tethers 35 are provided and are connected to the internal walls 41a and 41b of the airbag 3. In the inflated state of the airbag the tethers develop a V-shape. Owing to this configuration, the thickness of the airbag 3 in the horizontal direction H can advantageously be increased, while it deploys in an upward direction upon triggering the inflators.

FIGS. 14A-14C show different views of the external side air bag 3 of FIG. 12. As can be seen, the two smaller chambers 47 and 47' are integrated in the bigger chamber 47". In other words, the surrounding chamber 47" is at feast partially divided by the other two smaller chambers 47 and 47". The chambers are separated from each other by means of fabric panels. In each of the chambers 47 to 47" is preferably at least one tether 35a and 35b provided, which extends from a first internal wall to an opposite internal wall of the airbag 3. Each of the smaller chambers may comprise at least one venting hole 49 in a fabric panel, which opens to the middle part of the chamber 47". On the other hand, the two chambers 47 and 47' may be connected to each other via a connection channel made of fabric. The airbag may thus provide two different pressure levels for protecting different zones of the side structure 19. At this point, it should be noted that different chambers of an airbag may comprise different shapes and volumes, in particular different heights in the vertical direction V and different thicknesses in the horizontal direction H.

Figure 15:
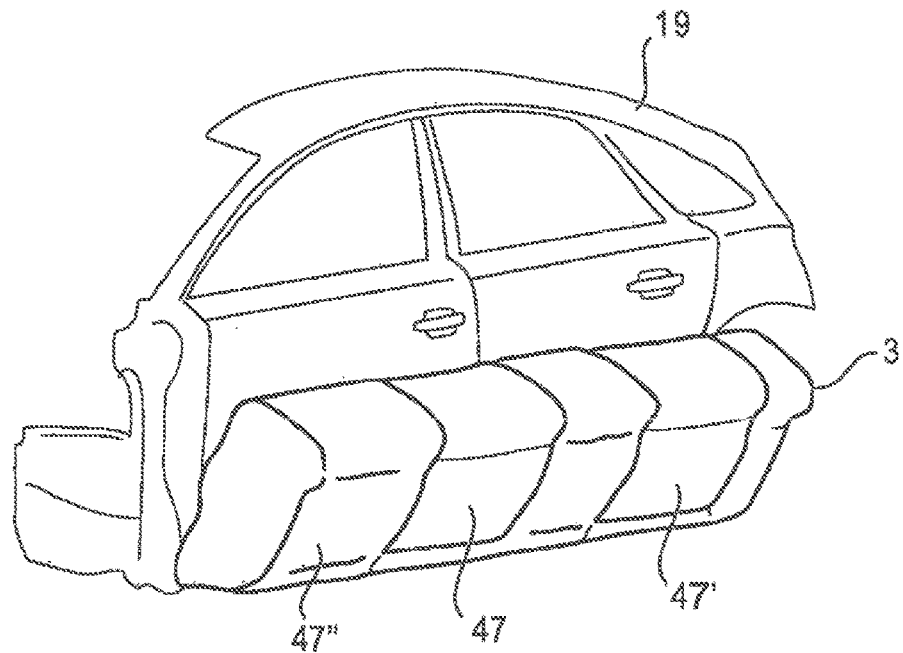
FIG. 15 A schematic perspective view of another external airbag system according to the present invention comprising a multi-chamber airbag.
Figure 16:
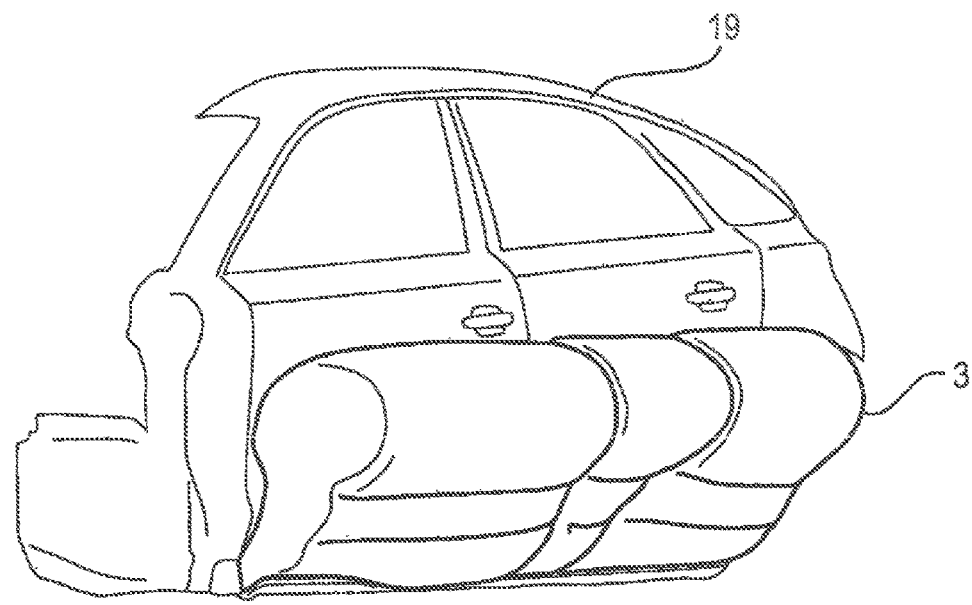
FIG. 16 A schematic perspective view of another external airbag system according to the present invention comprising a multi-chamber airbag.

FIGS. 15 and 16 show further embodiments of an airbag 3 having a multiple-chamber configuration, wherein different chambers may comprise different pressure levels in inflated folded state of the airbag. As can be seen from FIGS. 17A to 17C, the configuration of an airbag according to FIG. 15 corresponds essentially to the airbag shown in FIG. 12 and FIGS. 14A to 14C respectively. That is, the airbag 3 comprises three 47, 47', 47' and 47", wherein the pressure in the chambers 47 and 47' is substantially lower than the pressure chamber 47". That is, the two chambers 47 and 47' again may be connected to each other. In contrast to the airbag 3 of FIG. 12, the height of the chambers in the vertical direction V is substantially equal in the present embodiment. Furthermore, each chamber comprises two tethers 35 and 35', which are provided in a distance to each other according a configuration, which is for example shown in FIG. 9.

As stated above, it is also possible to provide a venting connection between the two chambers 47 and 47', such that the two chambers 47 and 47' form a single pressure chamber, which is separated by means of fabric panels 51 from the other pressure chamber 47". In this case, the airbag 3 comprises only two chambers, which have two different pressure levels for covering different parts of the side structure of the vehicle.

FIGS. 18A-18C show different views of the airbag 3 according to FIG. 16. The airbag in this configuration comprises three chambers 47, 47' and 47", wherein chambers 47 and 47" are substantially used to cover the doors of the vehicle, wherein the middle chamber 47' is adapted to cover the B-pillar of a car. Each of the chambers 47 to 47" is provided with two tethers 35 and 35', wherein the configuration of the tethers may be one of the those shown in FIGS. 10A-10E. The chambers are separated from each other via fabric panels 51, wherein at least one venting hole 49 is preferably provided m one or more of the fabric panels 51. Also, an embodiment without any venting hole is possible.

Figure 19:
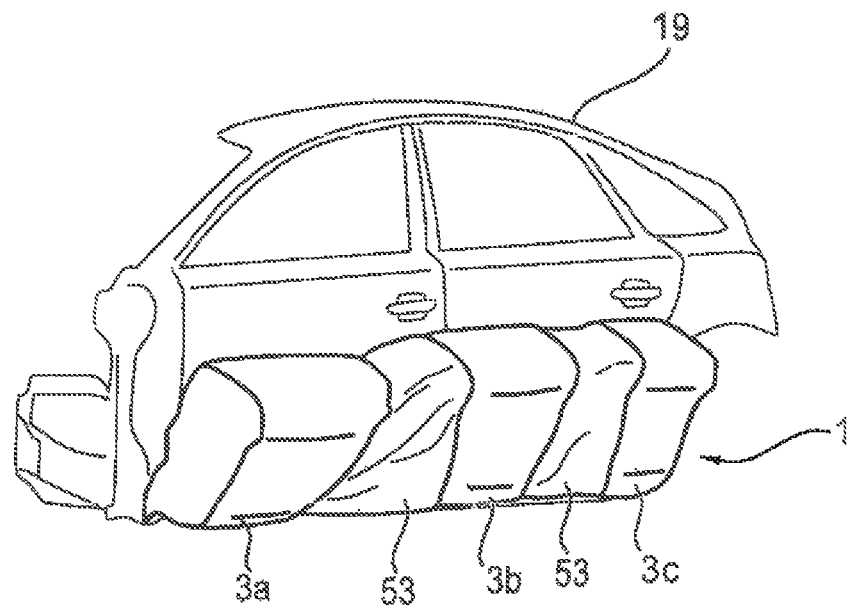
FIG. 19 A schematic perspective view of a further external side airbag system according to the present invention comprising more than one airbag.

FIG. 19 shows a further embodiment of the present invention, wherein an external side airbag system 1 comprises two or more separated airbags. In the configuration of FIG. 19, three airbags 3a, 3b and 3c are provided, wherein the airbags are connected with each other via a non-inflatable material 53, which stabilises the airbag system 1. In each of the airbags, two or more tethers are provided, which extend from a first internal side wall of the airbag to the opposite second internal side wall. Thereby, one tether is provided in the upper portion of the airbag, whereas another tether is provided in the lower portion thereof.

Figure 20:
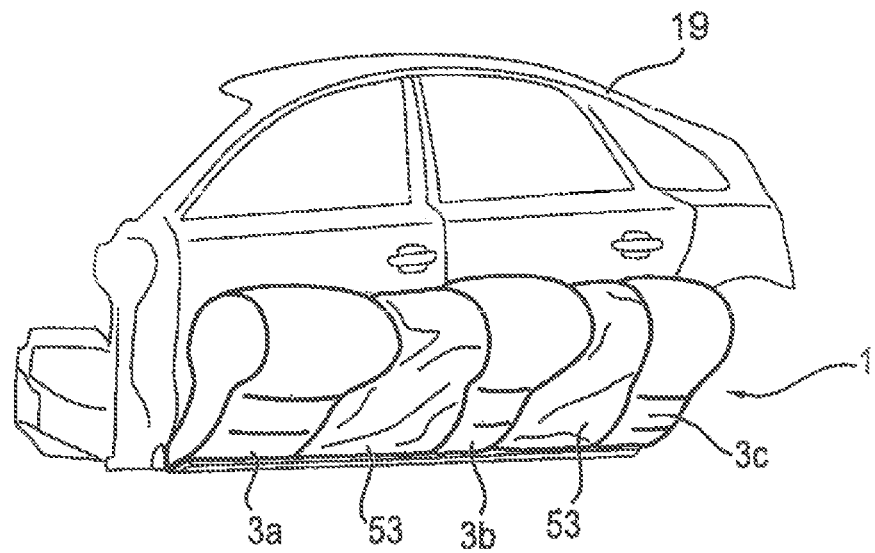
FIG. 20 A schematic perspective view of a further external side airbag system according to the present invention comprising more than one airbag.

FIG. 20 shows a similar configuration than that of FIG. 19 except that the shape of the single airbags 3a-3d is such that the airbag 3 provides a reduced thickness in front of the sill and an increased thickness and thus a better protection in front of the side doors and the B-pillar. The reduced thickness in the lower portion of the airbag can be achieved by a lower positioning and a shorter dimension of the tethers. Each of the airbags 3a-3c is provided with an inflator (not shown in FIGS. 19 and 20). Thereby, each of the separate airbags 3a-3d may have a different pressure level and a different geometry such that the airbag system 1 can be adjusted to achieve an optimal performance for each individual vehicle environment. The non-inflatable fabric 53, which connects between the airbags 3a-3c stabilises the external side airbag system 1 in an inflated state of the airbags 3a-3c.

Figure 21C:
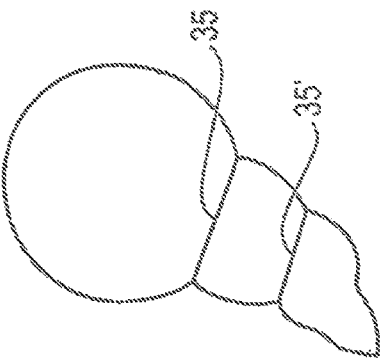
FIG. 21A-C Different views of the external side airbag system of FIG. 20.
Figure 21A:
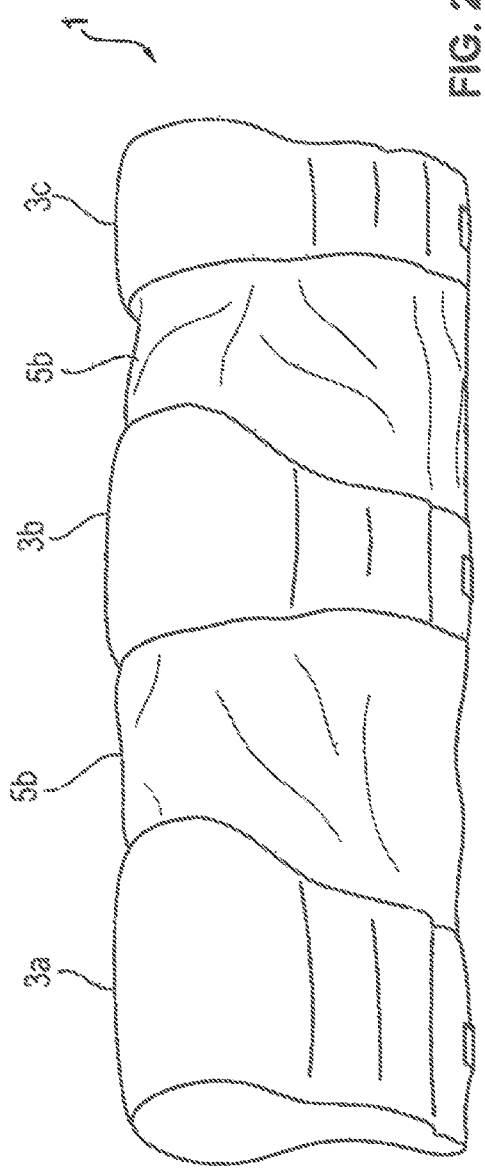
Figure 21B:
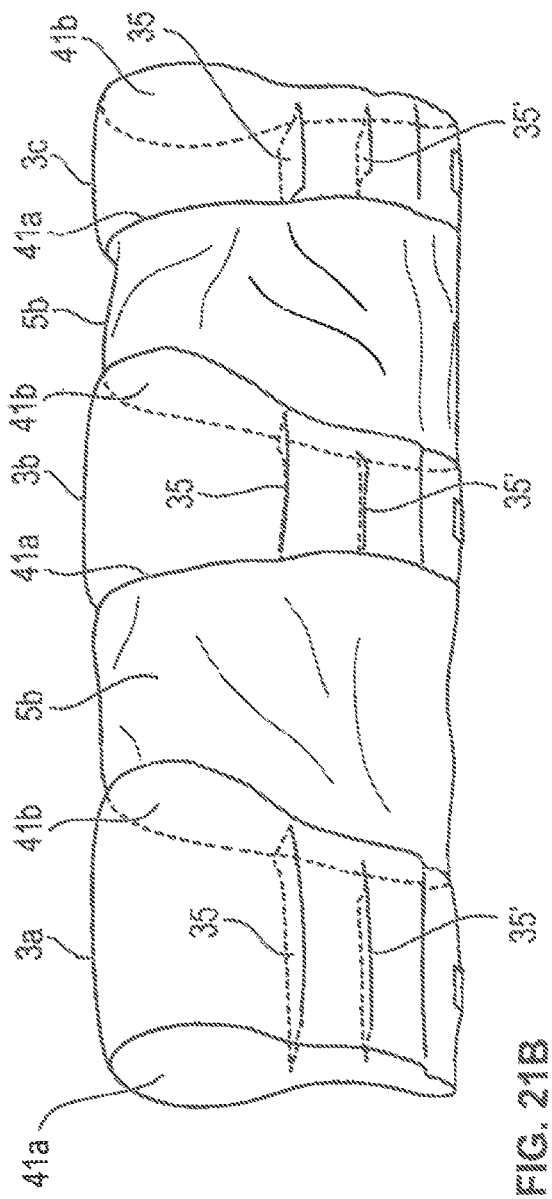

FIGS. 21A-21C show different views of the external airbag system 1 of FIG. 20. As can be seen, each of the airbags 3a-3c comprises two tethers 35 and 35', which extend from the first internal wall 41a to the opposite second internal wall 41b. The non-inflatable material 53 is connected to the circumferential side surfaces of the airbags 3a, 3b and 3c such that non-inflatable chambers are formed between the airbags 3a and 3b and a further non-inflatable chamber between the airbags 3b and 3c. Non-inflatable in this regard means that the chambers are not connected to an inflator. On the other hand, they may comprise venting holes to provide a flexible connection between the plurality of airbags.

In conclusion, the present invention provides for an advantageous external side airbag system, which in combination with a pre-crash detection system makes it possible to deploy an external airbag that partially covers the vehicle side. This external airbag absorbs part of the energy of the impact. Furthermore, it reduces also the intrusions and deformations in the struck car, and therefore reduces the occupant injuries. The system according to the present invention allows to reduce the energy received by the struck car and distributes it over the vehicle side structure 19. Consequently, it effectively contributes in reducing occupants injury values.

LIST OF REFERENCE NUMERALS

1 External side airbag system
3, 3a-3c Airbag
5a-5c Inflators
7a-7c Fixation means
9 Indentation
11 End portion
13 End portion
15a-15c Connecting pin
17a-17c Apertures
19 Side structure
21 Rocker panel
23 A-pillar
25 B-pillar
27 C-pillar
29 Roof pillar
31 Sill cover
33 Connection mechanism
35, 35' Tethers
35a, 35b Tethers
37 First end
39 Second end
41a, 41b Internal walls
43 Airbag mouth
45 Distal point
47 Chamber
49 Venting hole
51 Fabric panel
53 Non-inflatable material
L Longitudinal direction
V Vertical direction
A Plane
B Plane
C Plane
K Vehicle

The invention claimed is:

1. An external airbag system (1), comprising at least one airbag (3) with at least one dedicated inflator (5a-5c), the at least one airbag (3) having a first chamber (47") and at least one second chamber (47, 47'),
wherein the at least one airbag (3) has in a folded state an elongated shape that extends in a longitudinal direction and is integrated in a side structure (19) of a vehicle (K) outside of a vehicle's occupant compartment and between a rocker panel (21) and a sill cover (31) of the vehicle, and
in an inflated state of the at least one airbag (3), the at least one second chamber (47, 47') covers doors of the vehicle (K), and the first chamber (47") at least partially surrounds the at least one second chamber (47, 47') and covers both the sill cover (31) and pillars (23, 25, 27) of the vehicle (K).

2. The external airbag system according to claim 1, wherein fixation means (7a-c) are provided for fixing the at least one inflator (5a-5c) and the at least one airbag (3) to the rocker panel (21) of the vehicle (K).

3. The external airbag system according to the claim 1, wherein there are at least three inflators (5a-5c) provided that are substantially regularly distributed over an entire length of the at least one airbag (3) in the longitudinal direction (L) thereof.

4. The external airbag system according to claim 1, wherein the system comprises a pre-crash sensing system being adapted to detect a collision object and upon detection to fully deploy the at least one airbag before physical contact with the collision object, wherein the pre-crash sensing system comprises at least one sensor for sensing the collision object.

5. The external airbag system according to claim 1, wherein at least one airbag (3) comprises a double-layer fabric.

6. A vehicle comprising an external airbag system according to claim 1.

7. The external airbag system according to claim 1, wherein in the folded state, the airbag (3) continuously extends along a complete length of the rocker panel (21), and continuously extends from an A-pillar (23), over a B-pillar (25) and to a C-pillar (27).

8. The external airbag system according to claim 1, wherein in the inflated state of the airbag (3), the first chamber (47") has a first region that covers an A-pillar (23), a second region that covers a B-pillar (25), and a third region that covers a C-pillar (27), the second region of the first chamber (47") extends further in a vertical direction (V) than the first and third regions of the first chamber (47"), and the at least one second chamber (47, 47") is positioned in both a space between the first and second regions of the first chamber (47") and a space between the second and third regions of the first chamber (47").

9. The external airbag system according to claim 1, wherein each chamber (47, 47', 47") receives inflation gas from a dedicated inflator such that the separate chambers (47, 47', 47") may contain different pressure levels in the inflated state of the airbag (3).

10. The external airbag system according to claim 9, wherein the separate chambers (47, 47', 47") are arranged adjacent to each other and are distributed uniformly or non-uniformly over an entire length of the at least one airbag (3) in the longitudinal direction (L) thereof, wherein the separate chambers contain different sizes and shapes.

11. The external airbag system according to the claim 1, wherein the at least one airbag (3) comprises at least one internal tether (35, 35') that is attached to internal walls (41a, 41b) of the at least one airbag (3) and constructed such that the at least one airbag (3) deploys in a direction substantially perpendicular to the longitudinal direction (L) of the at least one airbag (3).

12. The external airbag system according to claim 11, wherein the at least one internal tether (35, 35') extends in the inflated airbag in a vertical direction (V) substantially perpendicular to the longitudinal direction (L) of the folded airbag and is attached to the internal walls (41a, 41b) that are arranged on opposite sides with respect to a plane (C) that cuts a longitudinal axis of the at least one airbag (3).

13. The external airbag airbag system according to claim 11, wherein a plurality of internal tethers (35, 35') is provided that are strap-shaped and substantially regularly distributed in at least one row over an entire length of the at least one airbag (3) in the longitudinal direction (L) thereof.

14. The external airbag system according to claim 11, wherein a plurality of internal tethers (35, 35') is arranged in at least two layers that are arranged a distance from each other in a vertical direction (V) of the at least one airbag (3).

15. The external airbag system according to claim 1, wherein a first plurality of internal tethers (35) are arranged in parallel in a first common plane (A) and a second plurality of internal tethers (35') are arranged in parallel in a second common plane (B), the first plurality of internal tethers (35) being positioned vertically above the second plurality of internal tethers (35'), each of the first and second plurality of internal tethers (35, 35') having first and second ends (37, 39) that are connected to opposing internal walls (41a, 41b) of the airbag (3), the first ends (37) of each of the first and second plurality of internal tethers (35, 35') being spaced at a different vertical distance from each other than the second ends (39) of each of the first and second plurality of internal tethers (35, 35').

16. The external airbag system according to claim 15, wherein the first ends (37) of the first and second plurality of internal tethers (35, 35') are spaced at a shorter vertical distance from each other than the second ends (39) of the first and second plurality of internal tethers (35, 35') so that in the inflated state of the airbag (3), the airbag (3) extends substantially in a vertical direction (V).

17. The external airbag system according to claim 15, wherein the second ends (39) of the first and second plurality of internal tethers (35, 35') are spaced at a shorter vertical distance from each other than the first ends (37) of the first and second plurality of internal tethers (35, 35') so that in the inflated state of the airbag (3), the airbag (3) extends in a vertical direction (V) and substantially in a horizontal direction (H) away from the side structure (19) of the vehicle (K).

18. An external airbag system (1), comprising at least one airbag (3) with at least one dedicated inflator (5a-5c);
a first plurality of internal tethers (35) being arranged in parallel in a first common plane (A) and a second plurality of internal tethers (35') being arranged in parallel in a second common plane (B), the first plurality of internal tethers (35) being positioned vertically above the second plurality of internal tethers (35'), each of the first and second plurality of internal tethers (35, 35') having first and second ends (37, 39) that are connected to opposing internal walls (41a, 41b) of the airbag (3), the first ends (37) of each of the first and second plurality of internal tethers (35, 35') being spaced at a different vertical distance from each other than the second ends (39) of each of the first and second plurality of internal tethers (35, 35');
wherein the at least one airbag (3) has in a folded state an elongated shape that extends in a longitudinal direction and is integrated in a side structure (19) of a vehicle (K) outside of a vehicle's occupant compartment and between a rocker panel (21) and a sill cover (31) of the vehicle.

19. The external airbag system according to claim 18, wherein fixation means (7a-c) are provided for fixing the at least one inflator (5a-5c) and the at least one airbag (3) to the rocker panel (21) of the vehicle (K).

20. The external airbag system according to claim 18, wherein a size and shape of the at least one airbag (3) in an inflated state is such that it is adapted to cover at least partially the doors and a B-pillar (25) of the vehicle.

21. The external airbag system according to the claim 18, wherein the first and second plurality of internal tethers (35, 35') are constructed such that the at least one airbag (3) deploys in a direction substantially perpendicular to the longitudinal direction (L) of the at least one airbag (3).

22. The external airbag system according to claim 18, wherein there are at least three inflators (5a-5c) provided that are substantially regularly distributed over an entire length of the at least one airbag (3) in the longitudinal direction (L) thereof.

23. The external airbag system according to claim 18, wherein an interior of the at least one airbag (3) comprises a single chamber which is adapted to receive an inflation gas from the at least one inflator (5a-5c) to establish a substantially uniform pressure level in the single chamber.

24. The external airbag system according to claim 18, wherein two or more separate airbags (3a-3c) are provided and arranged adjacent to each other in the longitudinal direction (L) of the airbags (3a-3c), which are adapted to cover in an inflated state different parts of the side structure (19), and wherein the two or more separate airbags (3a-3c) arranged adjacent to each other are connected to each other via a non-inflatable fabric (53).

25. The external airbag system according to claim 18, wherein the first ends (37) of the first and second plurality of internal tethers (35, 35') are spaced at a shorter vertical distance from each other than the second ends (39) of the first and second plurality of internal tethers (35, 35') so that in the inflated state of the airbag (3), the airbag (3) extends substantially in a vertical direction (V).

26. The external airbag system according to claim 18, wherein the second ends (39) of the first and second plurality of internal tethers (35, 35') are spaced at a shorter vertical distance from each other than the first ends (37) of the first and second plurality of internal tethers (35, 35') so that in the inflated state of the airbag (3), the airbag (3) extends in a vertical direction (V) and substantially in a horizontal direction (H) away from the side structure (19) of the vehicle (K).

27. The external airbag system according to claim 18, wherein the at least one airbag (3) has a first chamber (47") and at least one second chamber (47, 47'), and in an inflated state of the at least one airbag (3), the at least one second chamber (47, 47') covers doors of the vehicle (K), and the first chamber (47") at least partially surrounds the at least one second chamber (47, 47') and covers both the sill cover (31) and pillars (23, 25, 27) of the vehicle (K).

28. The external airbag system according to claim 27, wherein in the inflated state of the airbag (3), the first chamber (47") has a first region that covers an A-pillar (23), a second region that covers a B-pillar (25), and a third region that covers a C-pillar (27), the second region of the first chamber (47") extends further in a vertical direction (V) than the first and third regions of the first chamber (47"), and the at least one second chamber (47, 47") is positioned in both a space between the first and second regions of the first chamber (47") and a space between the second and third regions of the first chamber (47").

* * * * *